United States Patent
Yu et al.

(10) Patent No.: US 8,348,443 B2
(45) Date of Patent: Jan. 8, 2013

(54) DOCUMENT CAMERA AND ITS LIGHT BOX

(75) Inventors: Cheng-Cheng Yu, Taipei Hsien (TW); Chun-Wei Lu, Taipei Hsien (TW); Yi-Cheng Chien, Taipei Hsien (TW)

(73) Assignee: AVer Information Inc., New Taipei (TW)

( * ) Notice: Subject to any disclaimer, the term of this patent is extended or adjusted under 35 U.S.C. 154(b) by 261 days.

(21) Appl. No.: 12/784,408

(22) Filed: May 20, 2010

(65) Prior Publication Data

US 2011/0228538 A1    Sep. 22, 2011

(30) Foreign Application Priority Data

Mar. 22, 2010   (TW) .............................. 99108395 A

(51) Int. Cl.
  *G03B 15/02*   (2006.01)
  *G03B 27/04*   (2006.01)
(52) U.S. Cl. ......................................... 362/18; 355/113
(58) Field of Classification Search .................. 355/113; 358/474; 362/18
  See application file for complete search history.

(56) References Cited

U.S. PATENT DOCUMENTS

| | | | | |
|---|---|---|---|---|
| 2,092,573 A | * | 9/1937 | Doane | 40/546 |
| 5,894,529 A | * | 4/1999 | Ting | 382/312 |
| 2004/0139637 A1 | | 7/2004 | Lee | |
| 2011/0007492 A1 | * | 1/2011 | Sauer et al. | 362/85 |

FOREIGN PATENT DOCUMENTS

| TW | M309822 | 4/2007 |
|---|---|---|
| TW | M374287 | 2/2010 |

* cited by examiner

*Primary Examiner* — Anh Mai
*Assistant Examiner* — Michael Santonocito
(74) *Attorney, Agent, or Firm* — CKC & Partners Co., Ltd.

(57) ABSTRACT

A document camera and its light box are provided in the disclosure. The light box includes a base, a light guiding plate embedded in the base, and a light source device movably disposed on the base. The light guiding plate has a light input face and a light output face which are both light transmissive from the base. When the light source device is moved to face the light input face, the light source device provides lights outwards the light guiding plate via the light input face, otherwise, when the light source device is moved away from the light input face, the light source device provides light to the light output face down wards.

9 Claims, 15 Drawing Sheets

DOCUMENT CAMERA AND ITS LIGHT BOX

RELATED APPLICATIONS

This application claims priority to Taiwan Application Serial Number 99108395, filed Mar. 22, 2010, which is herein incorporated by reference.

BACKGROUND

1. Technical Field

The disclosure relates to a light box, more particularly to a light box for a document camera.

2. Description of Related Art

A conventional document camera for briefing needs a light box for illuminating transparent slides, filmstrips, positive & negative films, X-ray slides or shot objects, which are placed on the light box. The conventional document camera normally is divided into two types of the document camera with an external light box and with a built-in light box.

Besides, when a shot object placed on the light box needs to be illuminated, an auxiliary light source which is set on an extended arm of the document camera above the light box also can provide lights downwards the light box for illumination of the shot object, so as to provide another direction of lights to the shot object.

However, regarding a purpose of cost down, the conventional document camera can be improved in the aspect of cost down, since the conventional document camera installs both a light source under the light box and the auxiliary light source over the light box.

SUMMARY

Therefore, an aspect of the present disclosure is to present a document camera and its light box which can provide users to select an upward illumination direction or a downward illumination direction for illumination of the light box by using a light source capable of changing the irradiating directions of lights.

Another aspect of the present disclosure is to present a document camera and its light box which can decrease the quantity of light source devices equipped on the document camera, so as to lower the purchase cost of the light source devices.

In an embodiment of the disclosure, the light box comprises a base, an optical module and a light source device. The optical module is disposed in the base, and has a light output face and a light input face thereon, wherein both the light output face and the light input face are light transmissive from the base. The light source device is movably disposed on the base for facing the light input face thereof or the light output face thereof. Therefore, when the light source device is moved to face the light input face thereof, the light source device provides lights towards the light input face thereof; when the light source device is moved away from the light input face thereof, the light source device provides lights towards the light output face thereof.

In the other embodiment of the disclosure, the document camera comprises the light box mentioned above and a digital photographing device. The digital photographing device captures images from the top surface of the base.

As mentioned above, the present disclosure of the document camera and its light box decreases the quantity of the light source devices for the document camera, but still provides enough illumination for the document camera.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
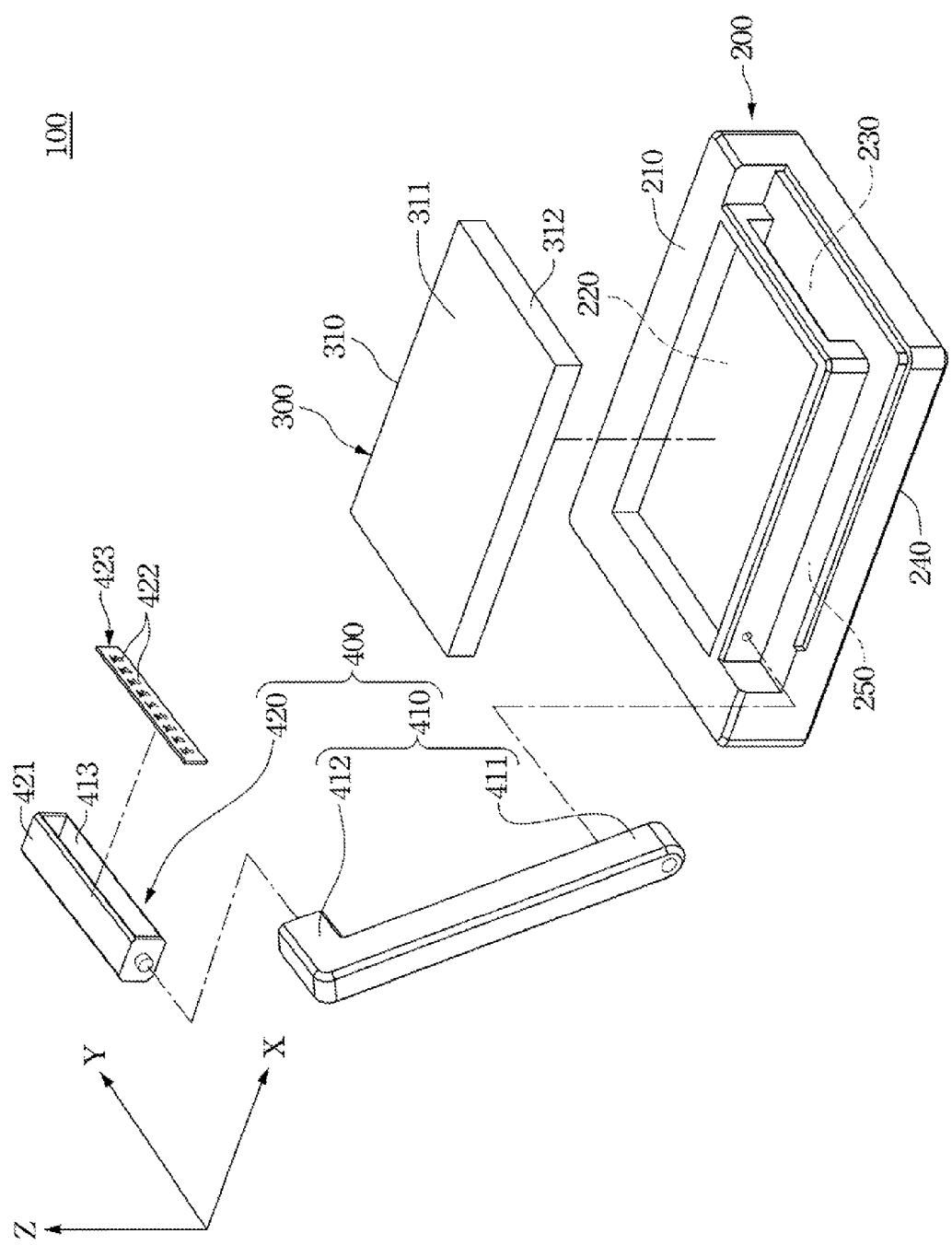
FIG. 1 is a disassembled view of a light box in accordance with one embodiment of the present disclosure.

Refer to FIG. 1. FIG. 1 is a disassembled view of a light box 100 in accordance with one embodiment of the present disclosure. The present disclosure discloses a light box 100. The light box 100 comprises a base 200, an optical module 300 and a light source device 400.

The optical module 300 is embedded to lie flat in the base 200, and the optical module 300 has a light output face 311 and a light input face 312. Both the light output face 311 and the light input face 312 are exposed and visible from the base 200, or at least, both the light output face 311 and the light input face 312 are light transmissive from the base 200.

The light source device 400 is movably disposed on the base 200 and capable of moving to irradiate lights to the light input face 312 or the light output face 311 thereof. Therefore, when the light source device 400 is moved to face the light input face 312 thereof, the light source device 400 provides lights towards the light input face 312 thereof, the lights are directed outwards from the light output face 312; otherwise, when the light source device 400 is moved away from the light input face 312 thereof to face to the light output face 311 thereof, the light source device 400 directly provides lights towards the light output face 311 thereof.

Thus, no matter the document camera needs illumination of upward lights through the light box or downward lights to the objects on the light box, the light box 100 can provide the illumination of the upward lights or the downward lights after manipulating the light source device 400. Compared to the conventional arts, the present disclosure of light box only needs one set of the light source, and does not need to additionally purchase the auxiliary light source mentioned above, so as to save the purchase cost of light sources.

In detail, refer to FIG. 1 again, the base 200 has a top face 210 and a bottom face 240 opposite with each other. The top face 210 has a sunken zone 220 thereon, optionally, the sunken zone 220 is formed on a center of the top face 210. At least one of the lateral sides of the base 200 related to the sunken zone 220 has an opening 230. The opening 230 is penetrated through the lateral side of the base 200 to communicate with the sunken zone 220, or at least is light transmittable to the sunken zone 220, so that the light input face 312 is capable of receiving lights via the opening 230.

The optical module 300 is multilayered and arranged flat in the sunken zone 220. The optical module 300 at least comprises a light guiding plate 310. The light guiding plate 310 has a front face, a back face opposite to the front face, and four side faces all neighboringly connected with the front face and the back face. Thus, when the optical module 300 is the light guiding plate 310, the front face of the light guiding plate 310 can be the light output face 311 mentioned above, and each of the side faces can be the light input face 312 mentioned above to receive light from the opening 230.

Thus, after lights of the light source device 400 enter the light guiding plate 310 via the light input face 312, the lights are evenly distributed to the light output face 311 by the light guiding plate 310, and the lights are transmitted outwards the light guiding plate 310 from the light output face 311 so as to provide uniform illumination.

The light source device 400 comprises at least one moving member 410 and an irradiating portion 420. The moving member 410 is movably disposed on one of the lateral sides of the base 200, and thus can move to the lateral side of the base 200 having the opening 230 or move away from the opening 230 thereof.

The irradiating portion 420 is disposed on the moving member 410. Thus, the irradiating portion 420 can be moved with the moving member 410 to face the light input face 312 and to irradiate lights to the light input face 312 via the opening 230, otherwise, the irradiating portion 420 can be moved with the moving member 410 to face the top face 210 of the base 200 (i.e. light output face 312) and to irradiate lights towards the top face 210 of the base 200 (i.e. light output face 312).

As long as the irradiating portion 420 can be moved to face the light input face 312, the moving member 410 does not have to be arranged on the lateral side of the base 200 having the opening 230, the moving member 410 can be arranged on the other lateral side of the base 200 without the opening 230 as well.

According to the above descriptions, the present disclosure will provide several embodiments to further clarify the technical features of the present disclosure.

Refer to FIG. 1 again. The base 200 further has a containing area 250. The containing area 250 is disposed on the base 200 along two connected lateral sides thereof, and communicated with the sunken zone 220 via the opening 230, or at least the containing area 250 is light transmittable to the sunken zone 220, so that lights can be transmitted to the sunken zone 220 via the opening 230. In the embodiment, the containing area 250 can be presented as a shape of "L" type in accordance with a direction that the containing area 250 horizontally extends on the base 200. Furthermore, the shape of the containing area 250 is matched with the shape of the light source device 400 for accommodating the light source device 400.

Specifically, the moving member 410 is shaped as "L" type, and has a first end 411 and a second end 412 opposite with each other. The first end 411 of the moving member 410 is pivotally disposed on the lateral side of the base 200 in the containing area 250, the second end 412 of the moving member 410 carries the irradiating portion 420. Therefore, since the moving member 410 is rotated to revolve around the Y axis of FIG. 1, the moving member 410 can be rotated into the containing area 250 and being contained in the containing area 250, or the moving member 410 can be rotated out of the containing area 250 for being away from the containing area 250.

Figure 2:
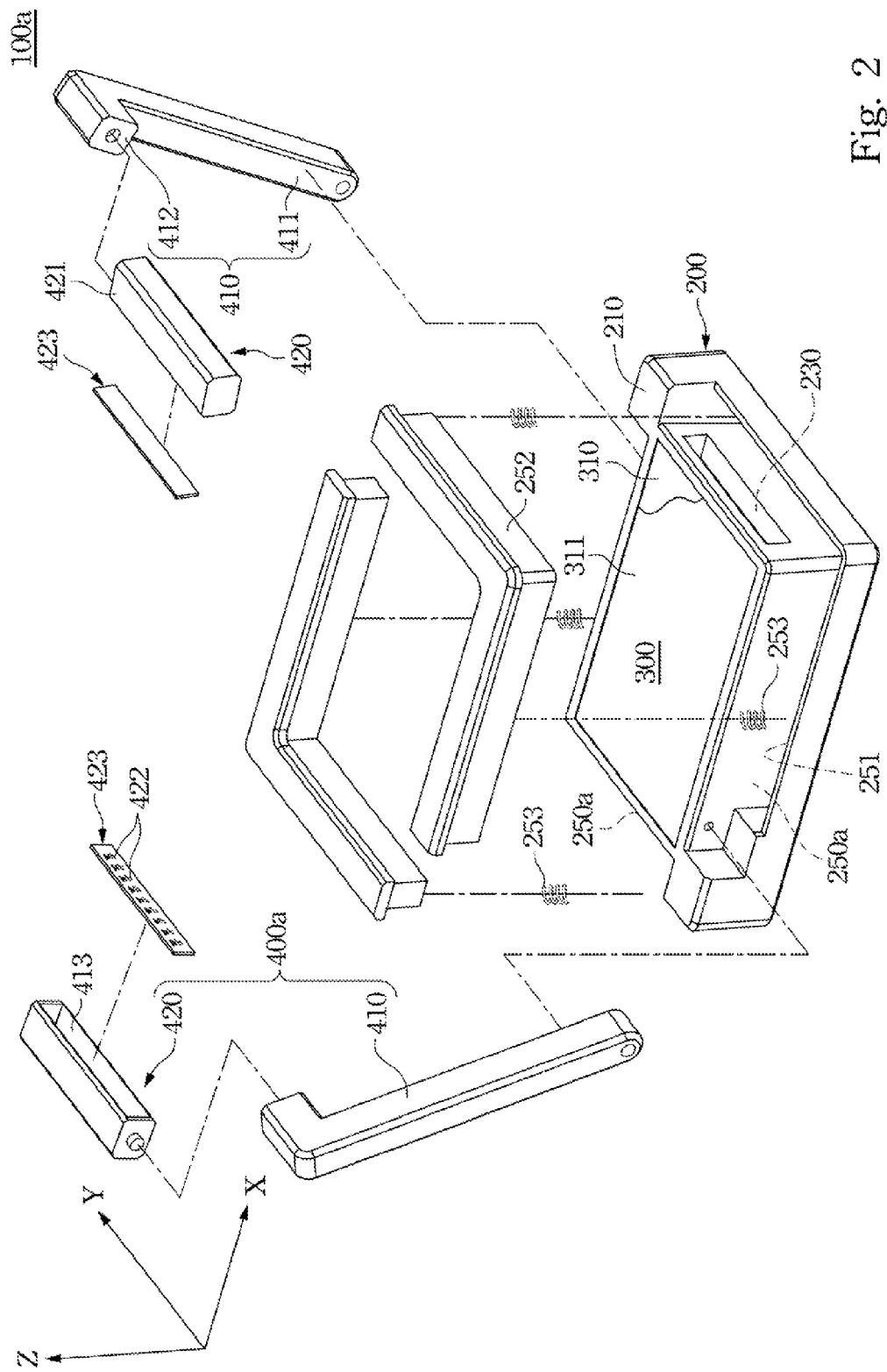
FIG. 2 is a disassembled view of a light box in accordance with the other embodiment of the present disclosure.
Figure 3A:
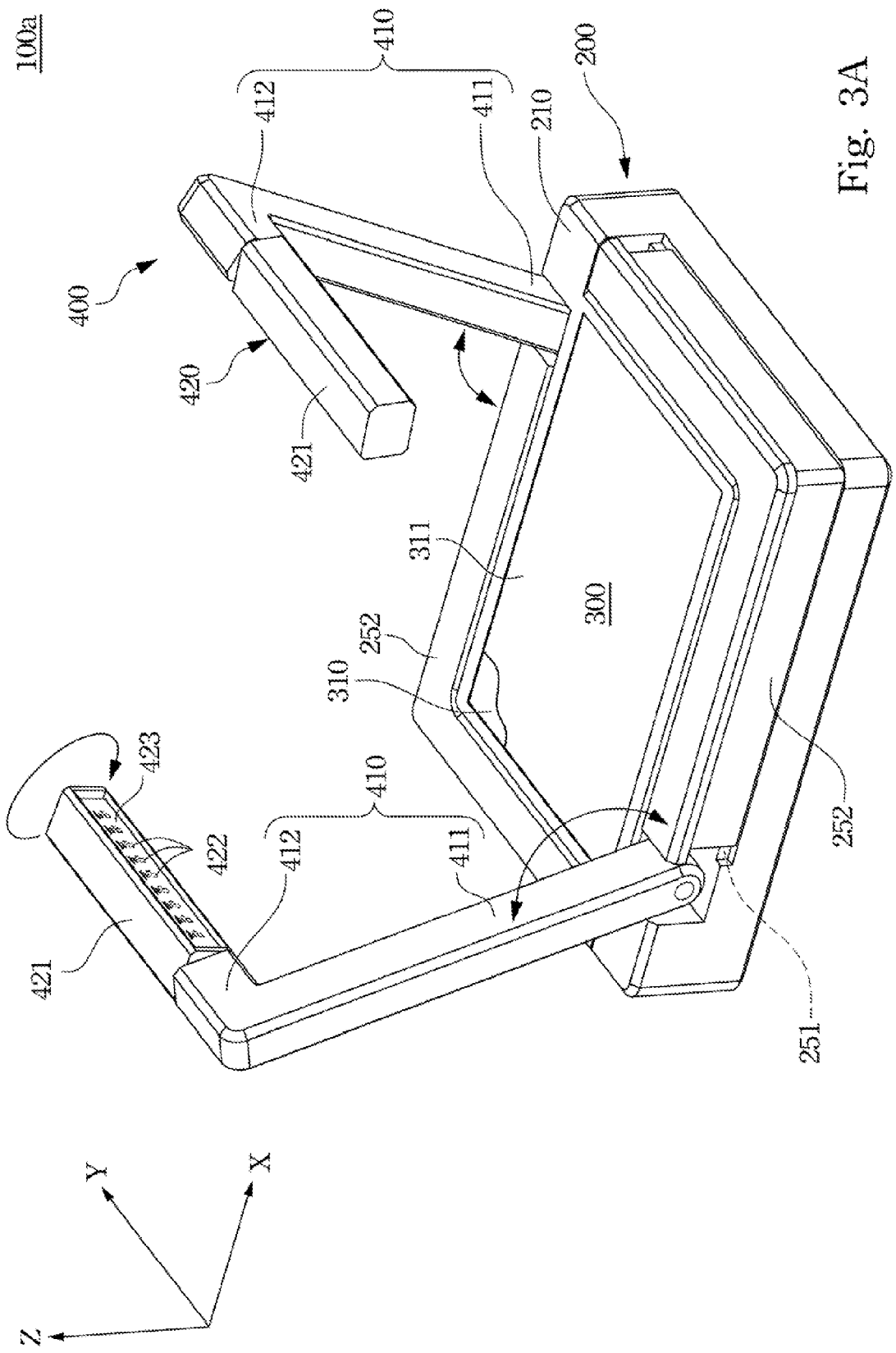
FIG. 3A and FIG. 3B are operational schematic views of the light box in accordance with the embodiment in FIG. 2.
Figure 3B:
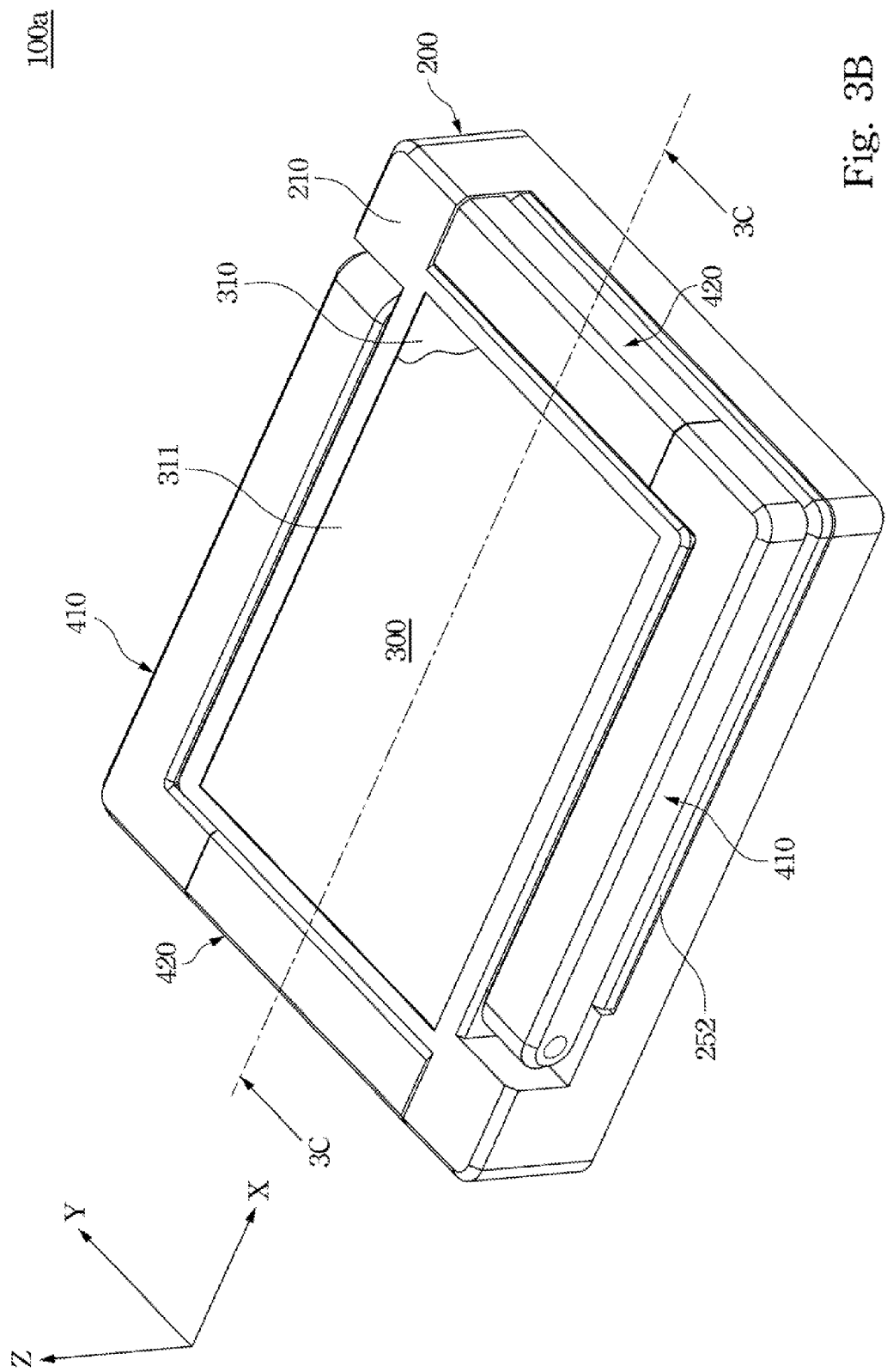

Refer to FIG. 2, FIG. 3A and FIG. 3B. FIG. 2 is a disassembled view of a light box 100a in accordance with the other embodiment of the present disclosure. FIG. 3A and FIG. 3B are operational schematic views of the light box 100a in accordance with the embodiment in FIG. 2.

The other embodiment of the present disclosure is modified upon the embodiment of FIG. 1, the light box 100a has a light source device 400a and a containing area 250a as well, however, different from the embodiment of FIG. 1, the light box 100a further has a fillister 251, a recoverable cover 252 and a spring 253. The fillister 251 is formed on the base 200 far away from the top face 210 thereof, and communicated with the containing area 250a. The recoverable cover 252 is movably disposed in the fillister 251 and the recoverable cover 252 can ascend into the containing area or descend into the fillister 251. The spring 253 is disposed in the fillister 251, and has two opposite ends. One end of the spring 253 connects with the recoverable cover 252, and the other end of the spring 253 connects with the inner wall of the fillister 251.

In one option of the embodiment in FIG. 2, the light box 100a can be modified to have two light source devices 400a, two containing areas 250a, two openings 230 (another is not shown), two fillisters 251 (another is not shown), two recoverable covers 252 and some of the springs 253 in which the light source devices 400a, the containing areas 250a, the openings 230, the fillisters 251, the recoverable covers 252 and the springs 253 are respectively disposed on two opposite lateral sides of the base 200.

Therefore, refer to FIG. 2 and FIG. 3B, when each moving member 410 is rotated relative to the Y axis of FIG. 3B to being contained in the corresponding containing area 250a, the moving member 410 pushes the recoverable cover 252 to descend into the fillister 251, meanwhile, the moving member 410 deforms the springs 253. Thus, the irradiating portion 420 can exactly face the opening 230 and irradiate lights to the light input face 312.

On the other hand, refer to FIG. 2 and FIG. 3A, when each moving member 410 is rotated relative to the Y axis of FIG. 3A to move away from the corresponding containing area 250a, the recoverable cover 252 is pushed by the springs 253 to ascend into the containing areas 250a to replace the space of the containing areas 250a used to contain the moving member 410. Even, the top surface of the recoverable cover 252 can be leveled with the top face 210 of the base 200. Thus, when the irradiating portion 420 is moved with the moving member 410 to position over the top face 210 of the base 200, the irradiating portion 420 irradiates lights downward to the top face 210 of the base 200 (or light output face 311).

Figure 3C:
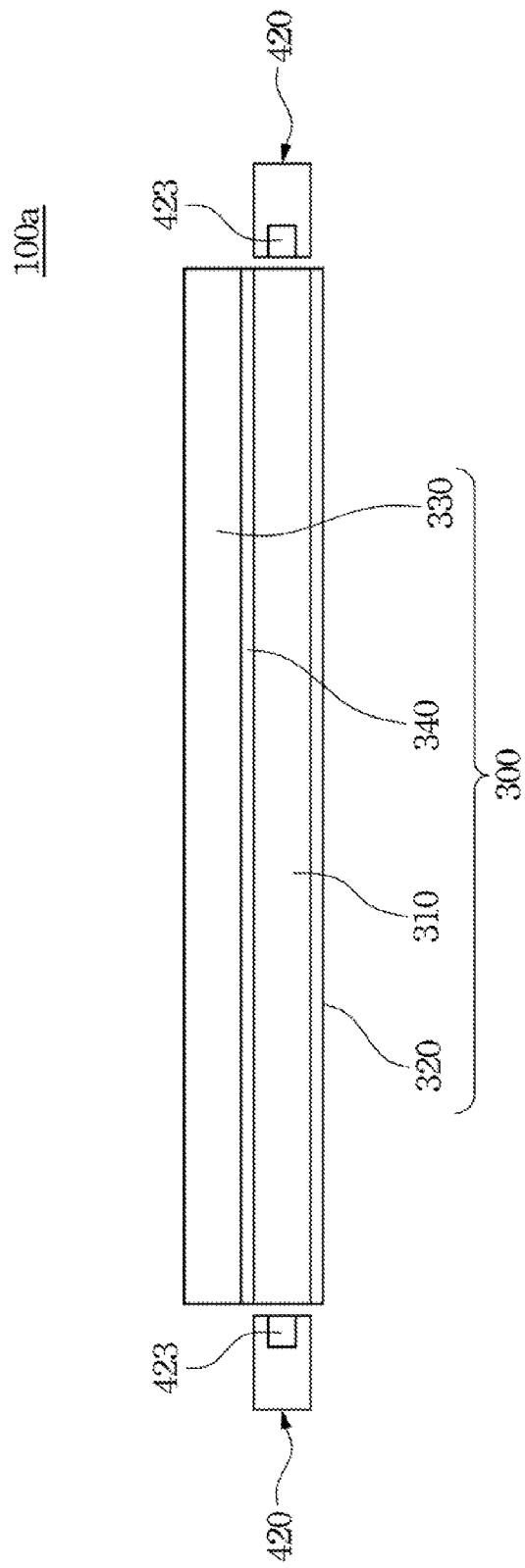
FIG. 3C is a cross-sectional view along a line 3C-3C in FIG. 3B.

Refer to FIG. 3C. FIG. 3C is a cross-sectional view along a line 3C-3C in FIG. 3B. In the embodiments mentioned above, the optical module 300 further comprise a reflect sheet 320, a diffusion board 330 and a diffusion sheet 340. The reflect sheet 320 is stacked on a surface of the light guiding plate 310 far away from the light output face 311 (FIG. 3C). The diffusion sheet 340 is stacked on a surface of the light guiding plate 310 far away from the reflect sheet 320 (FIG. 3C). The diffusion board 330 is greater than the diffusion sheet 340 in depth, and is on a surface of the diffusion sheet 340, so that the diffusion sheet 340 is between the diffusion board 330 and the light guiding plate 310.

Refer to FIG. 1 again, in the embodiments mentioned above, the irradiating portion 420 comprises a case 421 and a plurality of emitting elements 422. The case 421 is pivoted on the second end 412 of the moving member 410. The emitting elements 422, for example, can be light emitting diodes (LED) or cold cathode fluorescent lamps (CCFL). In the figures of the disclosure, some emitting elements 422 (i.e. LED) are linearly arranged on a circuit substrate to form a light bar 423. The light bar 423 is disposed in a holding chamber 413 of the case 421, and has an irradiating face exposing from the surface of the case 421, so that the light source device 400 can face the top face 210 of the base 200 or the light output face 311 with the irradiating face of the light bar 423.

Thus, when the moving element 410 is rotated to leave the containing area 250 and the irradiating portion 420 faces the top face 210 of the base 200 or the light output face 311, the irradiating portion 420 can be rotated related to the Y axis of FIG. 1 on the second end 412 of the moving member 410, so as to provide lights towards the top face 210 of the base 200 or the light output face 311 with different illumination angles by rotating the light bars 423.

Figure 4:
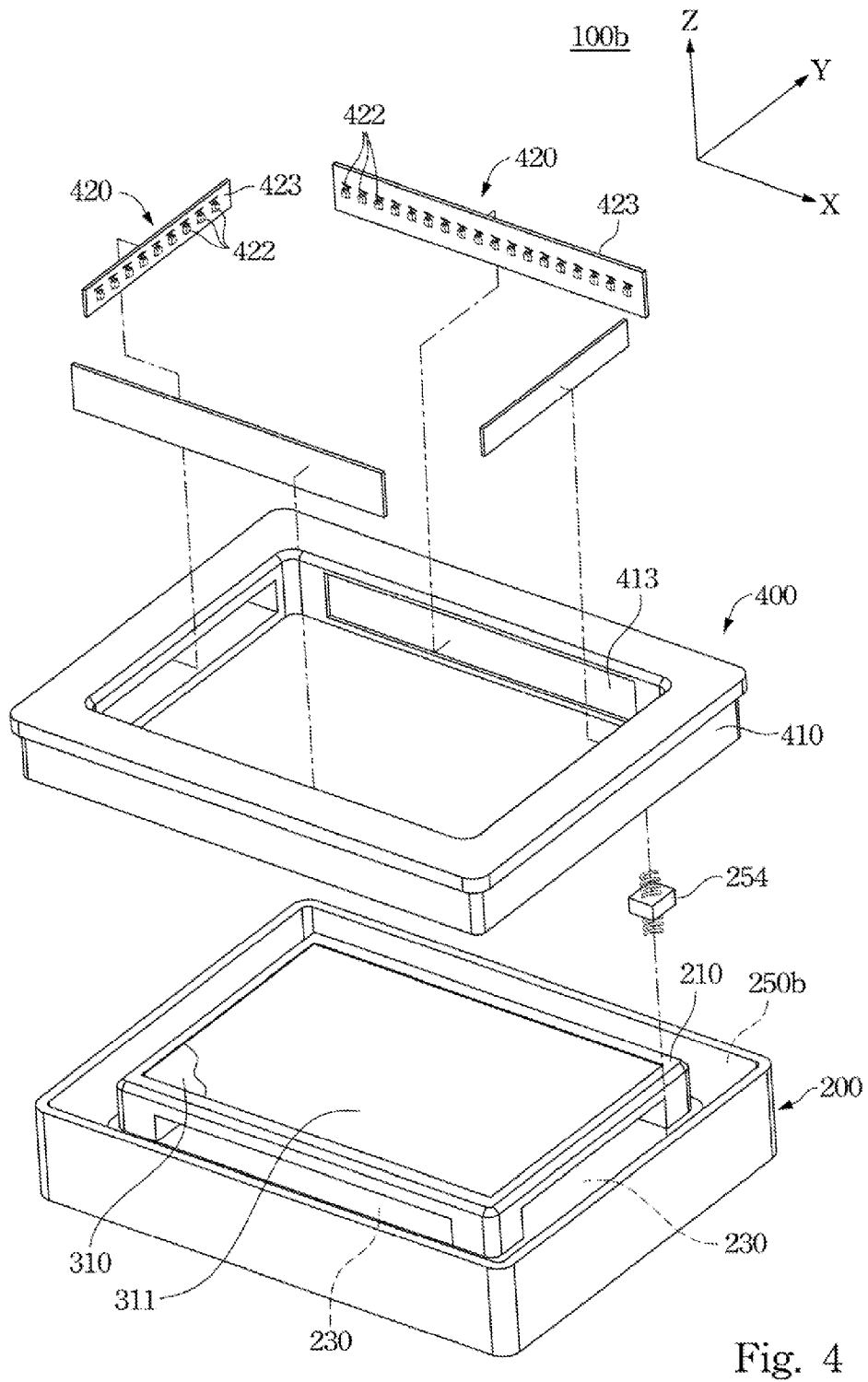
FIG. 4 is a disassembled view of a light box in accordance with another embodiment of the present disclosure.
Figure 5A:
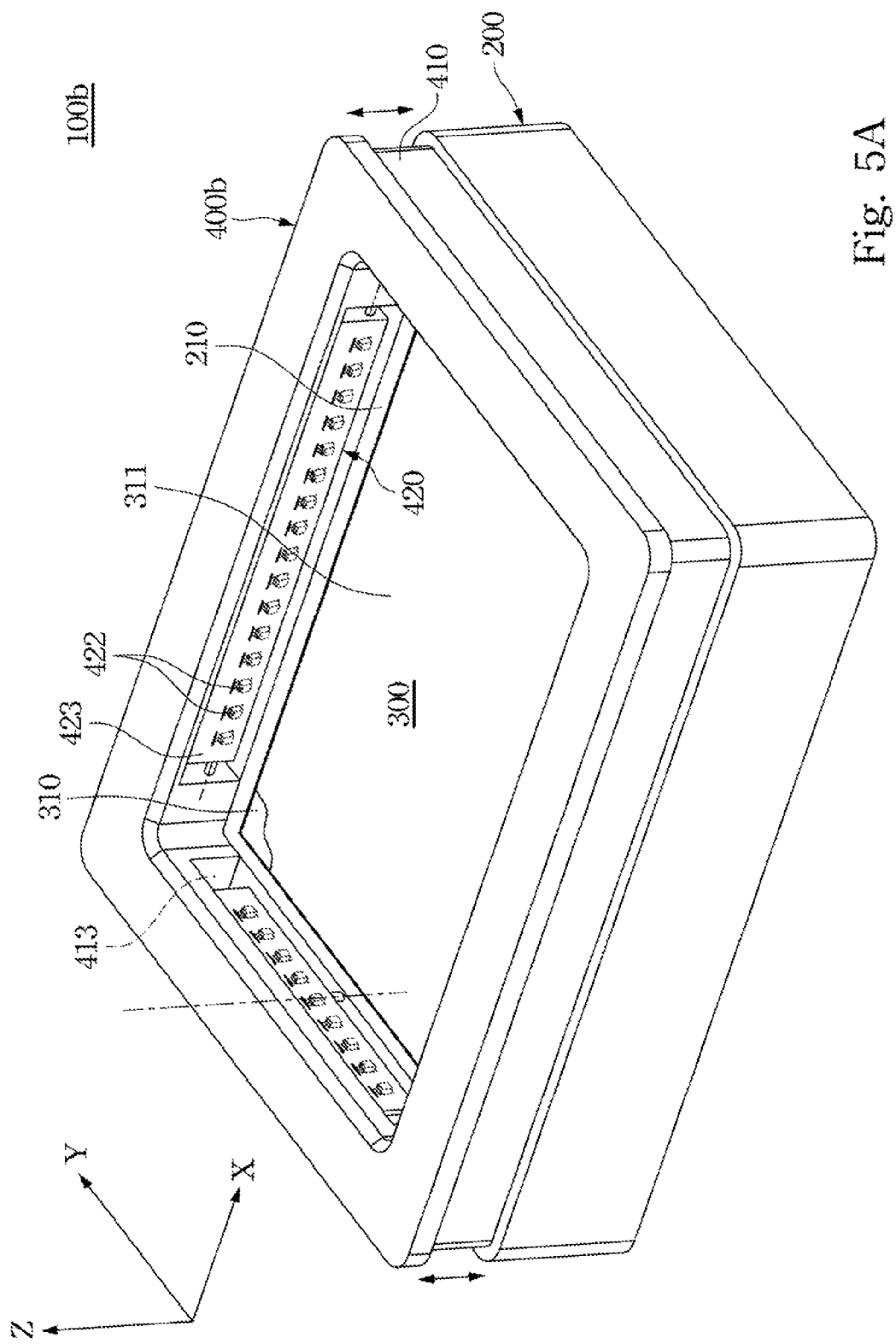
FIG. 5A and FIG. 5B are operational schematic views of the light box in accordance with the embodiment in FIG. 4.
Figure 5B:
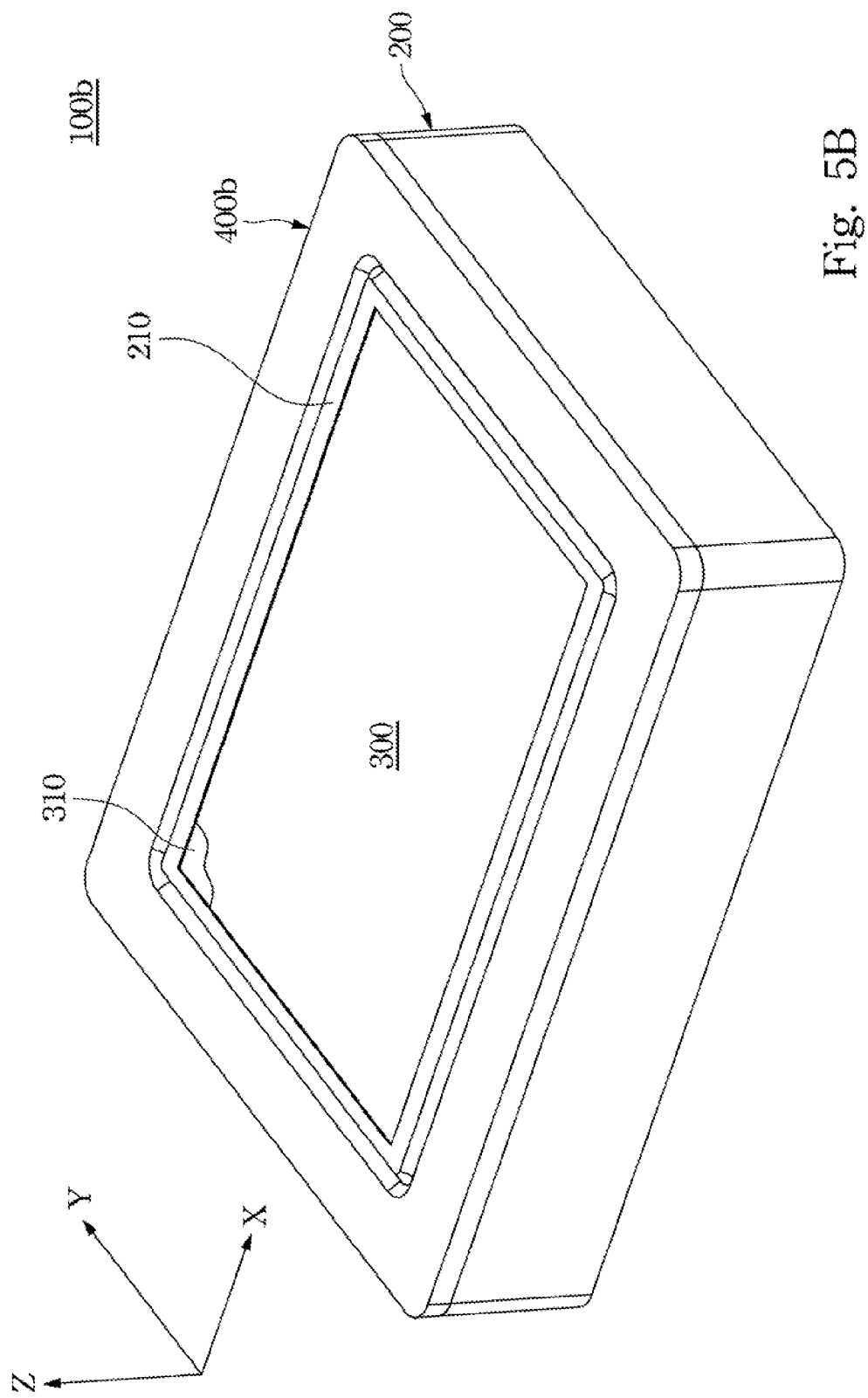

Refer to FIG. 4, FIG. 5A and FIG. 5B. FIG. 4 is a disassembled view of a light box 100b in accordance with another embodiment of the present disclosure. FIG. 5A and FIG. 5B are operational schematic views of the light box 100b in accordance with the embodiment in FIG. 4. The base 200 further has a containing area 250b formed on a border of the base 200, and the containing area 250b surrounds the optical module 300 disposed in the sunken zone 220. The containing area 250b can be presented as a shape of rectangular ring in accordance with a direction that the containing area 250b horizontally extends on the base 200. The base 200 has four lateral sides thereof for surrounding the optical module 300, and each of the lateral sides of the base 200 has one opening 230. The openings 230 are all communicated with the sunken zone 220 (FIG. 1) or at least are light transmittable to the sunken zone 220, so that lights can be transmitted to the light input face 312 via the opening 230. Furthermore, the shape of the containing area 250b is matched with the shape of the light source device 400b for accommodating the light source device 400b.

Specifically, the moving member 410 can be a frame shaped as a rectangular ring. The moving member 410 is linearly and movably disposed in the containing area 250b for ascending or descending in the containing area 250b, so that the moving member 410 can linearly ascend or descend in the containing area 250b. Furthermore, four inner lateral sides of the moving member 410 for surrounding the optical module 300 respectively have a holding chamber 413 for placing the irradiating portion 420.

The irradiating portion 420 comprises a plurality of emitting elements 422. The emitting elements 422, for example, can be light emitting diodes (LED) or cold cathode fluorescent lamps (CCFL). In the figures of the disclosure, some emitting elements 422 (i.e. LED) are linearly arranged on a circuit substrate to form a light bar 423. Each light bar 423 is disposed in one of the holding chambers 413, and has an irradiating face exposing outwards the surface of the moving member 410, so that the light source device 400b faces the top face 210 of the base 200 or the light output face 311 with the irradiating face of the light bar 423.

Thus, refer to FIG. 4 and FIG. 5A, when the moving element 410 in the containing area 250b linearly ascends along the Z axis of FIG. 5A to move the irradiating portions 420 upward, the irradiating portions 420 ascend together upon the top face 210 of the base 200, and provide lights towards the top face 210 of the base 200 or the light output face 311 together.

Contrarily, refer to FIG. 4 and FIG. 5B, when the moving element 410 in the containing area 250b linearly descends along the Z axis of FIG. 5B to move the irradiating portions 420 back into the containing area 250b, the irradiating portions 420 descend together to face the corresponding light input face 312 through the corresponding openings 230 respectively, and the irradiating portions 420 provide lights towards the corresponding light input face 312 through the corresponding openings 230 respectively.

In addition of another option, refer to FIG. 5A again, one of the light bars 423 can be pivoted in the holding chamber 413 of the moving member 410, so that the light bars 423 can be rotated related to the X axis (as shown) or Z axis (not shown) of the FIG. 5A when the irradiating portion 420 is ascended upwards upon the top face 210 of the base 200. Thus, the irradiating portions 420 can provide lights towards the top face 210 of the base 200 or the light output face 311 with different illumination angles by rotating the light bars 423.

Figure 6:
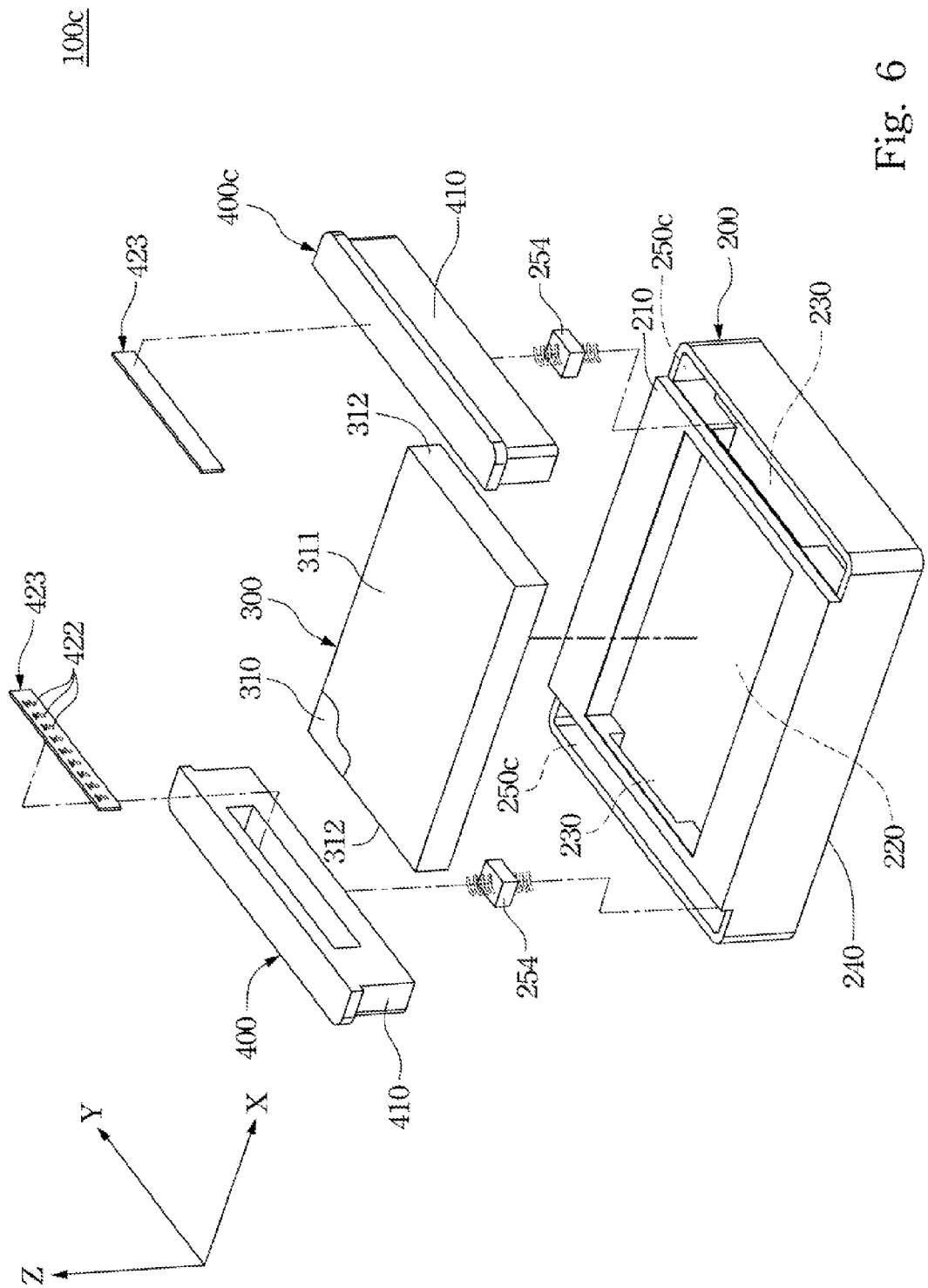
FIG. 6 is a disassembled view of a light box in accordance with another embodiment of the present disclosure.
Figure 7A:
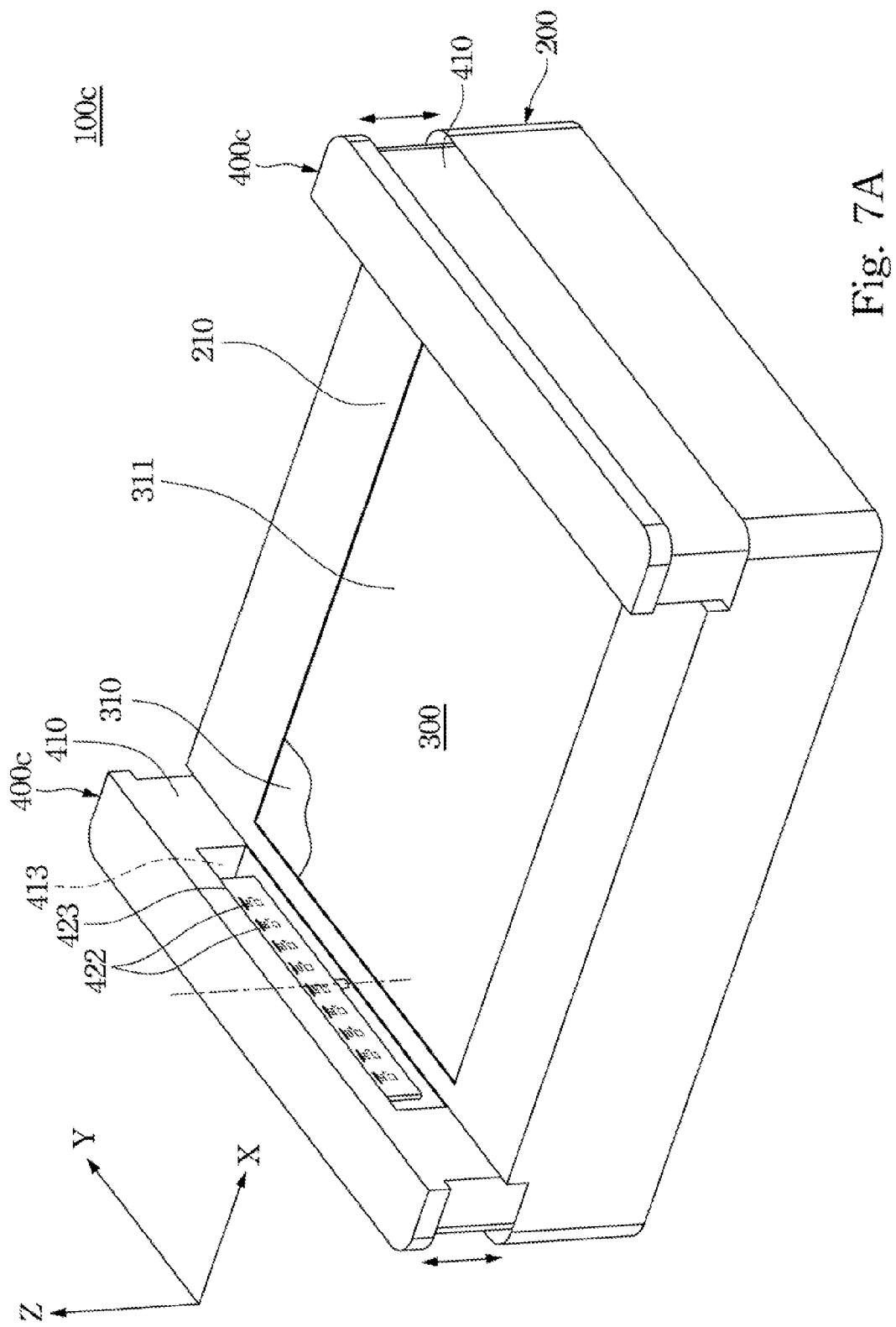
FIG. 7A and FIG. 7B are operational schematic views of the light box in accordance with the embodiment in FIG. 6.
Figure 7B:
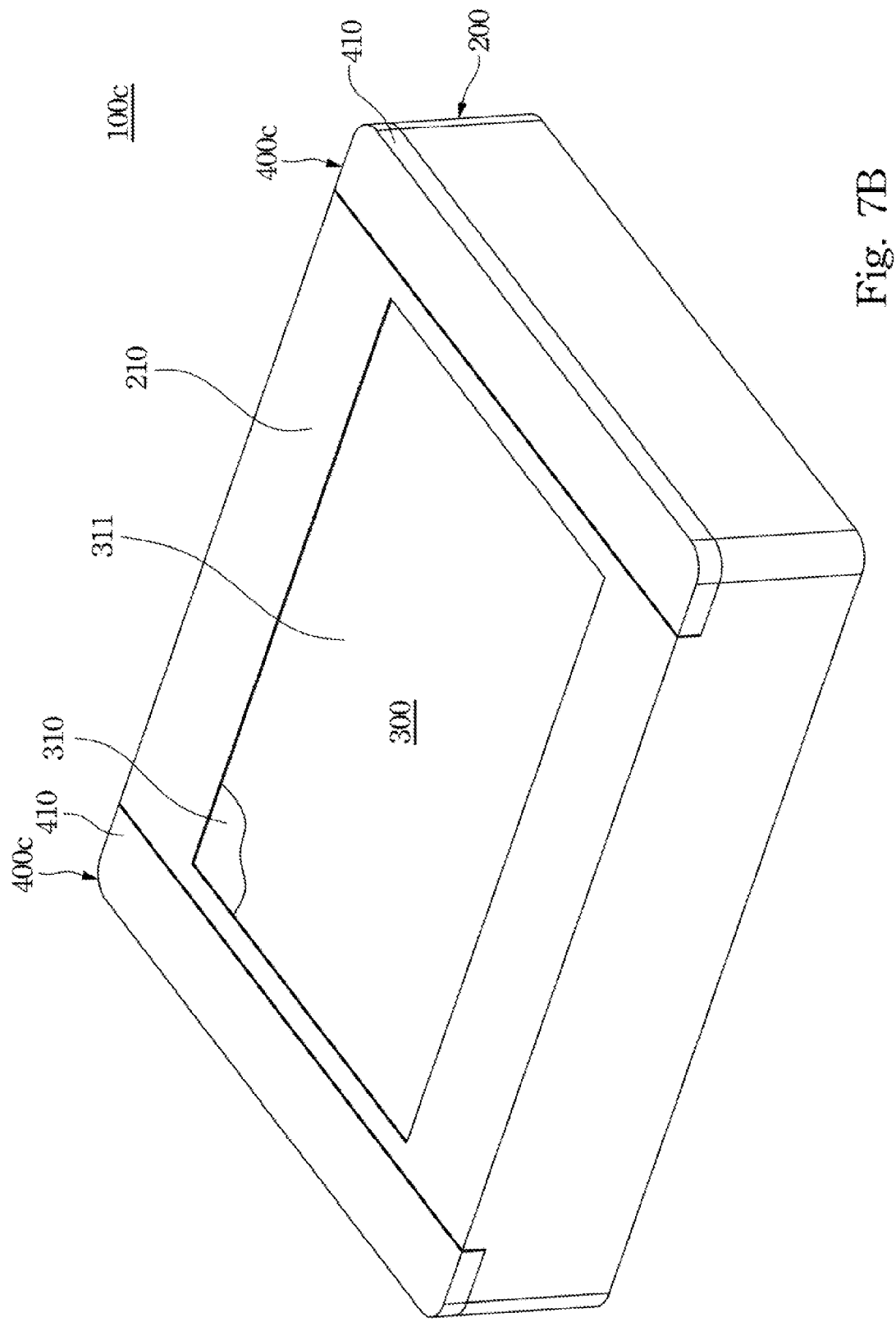

Refer to FIG. 6, FIG. 7A and FIG. 7B. FIG. 6 is a disassembled view of a light box 100c in accordance with another one embodiment of the present disclosure. FIG. 7A and FIG. 7B are operational schematic views of the light box 100c in accordance with the embodiment in FIG. 6.

The base 200 further has two containing areas 250c. The containing areas 250c are respectively formed on two opposite lateral sides of the base 200 respectively having one opening 230. Each containing area 250c is communicated with the sunken zone 220 (FIG. 6) or at least is light transmittable to the sunken zone 220, so that lights can be transmitted to the light input face 312 via the opening 230 (FIG. 6). Each containing area 250c can be presented as an "I" type in accordance with a direction that the containing area 250c horizontally extends on the base 200.

Specifically, in this embodiment, the light box 100c has two light source device 400c. The shape of the containing area 250c is matched with the shape of the light source device 400c for accommodating the light source device 400c. Each moving member 410 of the light source device 400c is movably extended into one of the containing areas 250c, so that each of the moving members 410 can linearly ascend or descend in the corresponding containing area 250c. Each moving member 410 has a first end 411 and a second end 412 opposite with each other. The first end 411 of the moving member 410 is extended in the containing area 250c, and the second end 412 of the moving member 410 has a holding chamber 413 for placing the irradiating portion 420.

In details, the irradiating portion 420 comprises a plurality of emitting elements 422. The emitting elements 422, for example, can be light emitting diodes (LED) or cold cathode fluorescent lamps (CCFL). In the figures of the disclosure, some emitting elements 422 (i.e. LED) are linearly arranged on a circuit substrate to form a light bar 423. Each light bar 423 is disposed in one of the holding chambers 413, and has an irradiating face exposing outwards the surface of the moving member 410, so that the light source device 400c faces the top face 210 of the base 200 or the light output face 311 with the irradiating face of the light bar 423.

Thus, refer to FIG. 6 and FIG. 7B, when two of the moving elements 410 in the containing areas 250c respectively descend along the Z axis of FIG. 7B to move the irradiating portion 420 back into the corresponding containing area 250c, the irradiating portions 420 descend to face the corresponding light input face 312 through the corresponding openings 230 respectively, and the irradiating portions 420 provide lights towards the corresponding light input face 312 through the corresponding openings 230 respectively.

Contrarily, refer to FIG. 6 and FIG. 7A, when two of the moving elements 410 in the containing areas 250c respectively ascend along the Z axis of FIG. 5A to move the irradiating portions 420 up, the irradiating portions 420 respectively ascend upon the top face 210 of the base 200, and provide lights towards the top face 210 of the base 200 or the light output face 311 respectively.

In addition of another option, refer to FIG. 7A again, one of the light bars 423 can be pivoted in the holding chamber 413 of the moving member 410, so that the light bars 423 can be rotated related to the Z axis (as shown) of the FIG. 7A when the irradiating portion 420 is ascended upwards the top face 210 of the base 200. Thus, the irradiating portions 420 can provide lights towards the top face 210 of the base 200 or the light output face 311 with different illumination angles by rotating the light bars 423. Alternatively, the light bars 423 also can be designed to rotate related to the Y axis (not shown) of the FIG. 7A.

Refer to FIG. 4 and FIG. 6, in practice, the embodiments in FIG. 4 and FIG. 6 can be equipped with at least one "push-lock, push-release" type of elastic component 254. The elastic component 254 is disposed in the containing area 250c (FIG. 6), and has two opposite ends. One end of the elastic component 254 connects with the moving member 410, and the other end of the elastic component 254 connects with the inner wall of the containing area 250c.

When the moving member 410 is pushed down into the containing area 250c (FIG. 6), the elastic component 254 is deformed and limited to recover back so that the moving member 410 can be retained in the containing area 250c. On the other hand, when the moving member 410 retained in the containing area 250c is pushed down again to the containing area 250c (FIG. 6), since a resilience force that provided from the deformed elastic component 254 is released, the moving member 410 then ascends along the Z axis of FIG. 7A in the containing area 250c upon the top face 210 of the base 200.

Figure 8:
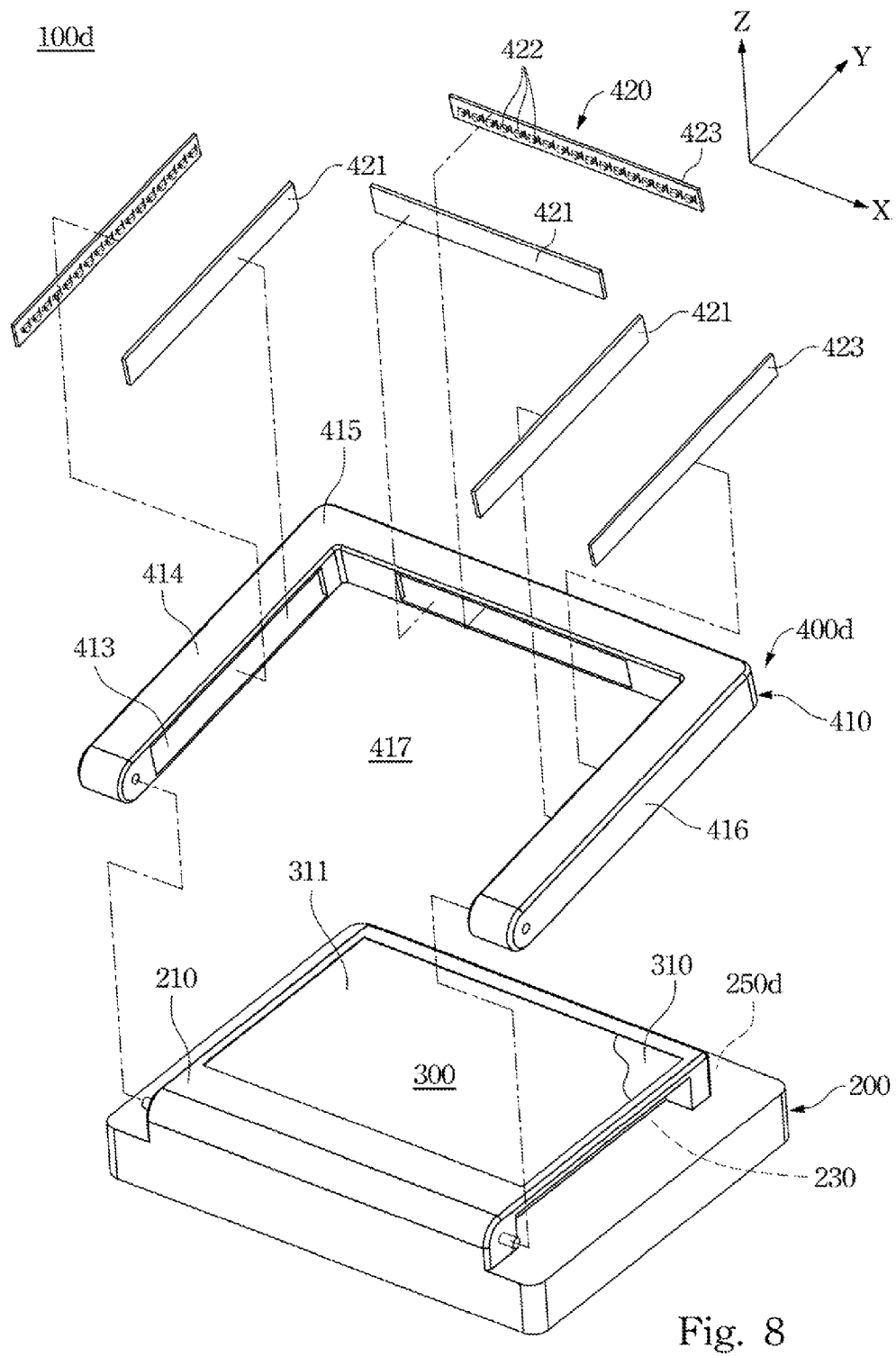
FIG. 8 is a disassembled view of a light box in accordance with another embodiment of the present disclosure.
Figure 9A:
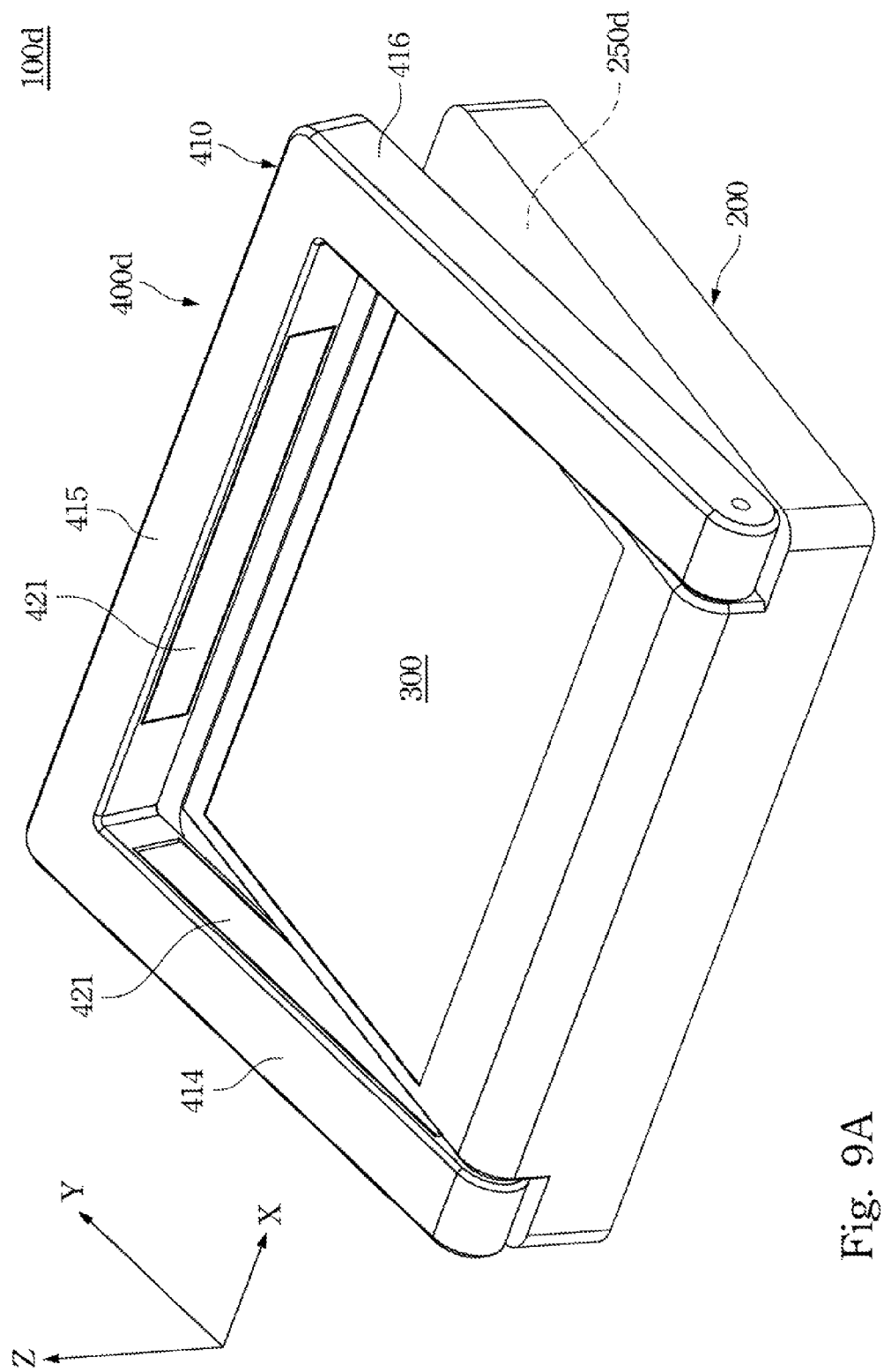
FIG. 9A and FIG. 9B are operational schematic views of the light box in accordance with the embodiment in FIG. 8.
Figure 9B:
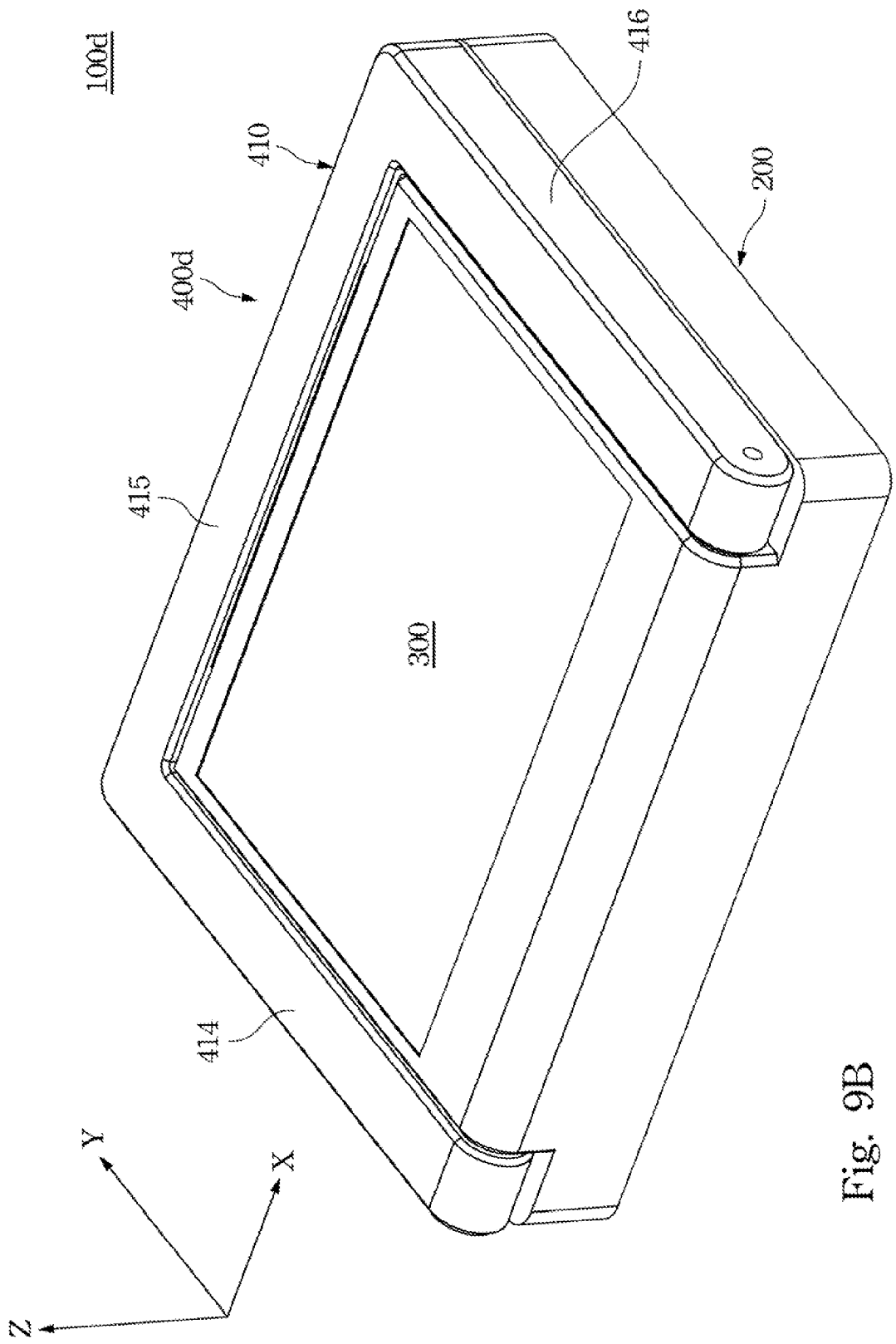

Refer to FIG. 8, FIG. 9A and FIG. 9B. FIG. 8 is a disassembled view of a light box 100d in accordance with another one embodiment of the present disclosure. FIG. 9A and FIG. 9B are operational schematic views of the light box 100d in accordance with the embodiment in FIG. 8.

The base 200 further has one containing area 250d. Each containing area 250d can be shaped as a "U" type in accordance with a direction that the containing area 250d horizontally extends on the base 200.

The containing area 250d is disposed on the base 200 along three connected lateral sides thereof respectively having one opening 230, and the containing area 250d is communicated with the sunken zone 220 (FIG. 1) via the openings 230, or at least the containing area 250d is light transmittable to the sunken zone 220, so that lights can be transmitted to the sunken zone 220 via the openings 230. Furthermore, the shape of the containing area 250d is matched with the shape of the light source device 400d for accommodating the light source device 400d.

In details, the moving member 410 is shaped as "U" type, and sequentially has a first arm 414, a second arm 415 and a third arm 416 thereof, and the first arm 414, the second arm 415 and the third arm 416 define an internal space 417. The second arm 415 thereof is connected between the first arm 414 and the third arm 416 thereof, and the first arm 414 and the third arm 416 thereof are extended towards a same direction, and both of the first arm 414 and the third arm 416 are pivoted on two opposite lateral sides of the base 200.

The first arm 414, the second arm 415 and the third arm 416 respectively have an irradiating portion 420. These irradiating portions 420 are respectively disposed on an inner surface of the first arm 414, the second arm 415 and the third arm 416, and all orient to the internal space 417 of the moving member 410.

In details, the first arm 414, the second arm 415 and the third arm 416 respectively have a holding chamber 413 for containing the irradiating portion 420. These holding chambers 413 are orient to the internal space 417 of the moving member 410.

Each of the irradiating portions 420 includes a plurality of emitting elements 422 and light-transmissive covers 421. The emitting elements 422, for example, can be light emitting diodes (LED) or cold cathode fluorescent lamps (CCFL). In the figures of the disclosure, some emitting elements 422 (i.e. LED) are linearly arranged on a circuit substrate to form a light bar 423. Each light bar 423 is disposed in one of the holding chambers 413, and each holding chamber 413 is covered by one of the light-transmissive covers 421. Thus, the light-transmissive covers 421 are exposed on the surface of the first arm 414, the second arm 415 and the third arm 416, respectively.

Therefore, since the moving member 410 is rotated relative to the X axis of FIG. 9A, the moving member 410 can be rotated away from the containing area 250d, meanwhile, the light-transmissive covers 421 respectively placed on the surfaces of the first arm 414, the second arm 415 and the third arm 416 are substantially facing the light output face 311, thus, the irradiating portions 420 can provide lights towards an object (not shown) on the optical module 300 or top face 210 of the base 200.

Contrarily, refer to FIG. 8 and FIG. 9B, since the moving member 410 is rotated relative to the X axis of FIG. 9B, the moving member 410 can be rotated into the containing area 250d to being contained in the containing area 250d, meanwhile, the light-transmissive covers 421 respectively placed on the surfaces of the first arm 414, the second arm 415 and the third arm 416 are substantially facing a corresponding opening 230, thus, the irradiating portions 420 can respectively provide lights towards the sunken zone 220 (i.e. light input face 312) via the corresponding opening 230.

However, this embodiment of the disclosure is not limited to a single light source device 400d only, one of ordinary skill in the art of the disclosure who is taught by this embodiment will connect to two light source devices 400d both pivoted on the opposite lateral sides of the base 200. Thus, when the two light source devices 400d are rotated to get close with each other, the irradiating portions 420 of the two light source devices 400d respectively facing a half part of the light output face 311 can provide lights towards the corresponding part of the light output face 311.

Figure 10:
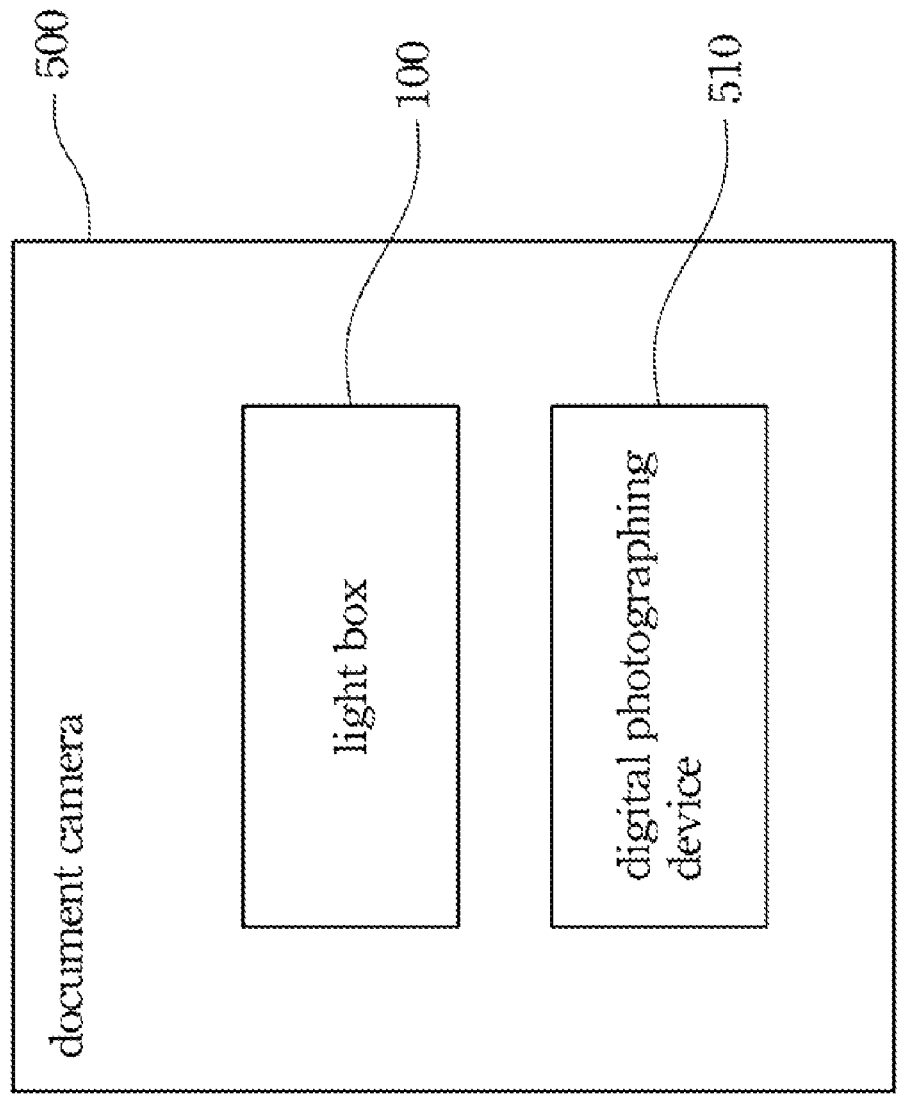
FIG. 10 is a block chart of a document camera of the present disclosure.

Refer to FIG. 1 and FIG. 10. FIG. 10 is a block chart of a document camera of the present disclosure. In those embodiments mentioned above, the light box 100 can be implemented on a document camera 500, in which the document camera 500 comprises a digital photographing device 510. The digital photographing device 510 can be integrated with the light box 100 in one, or work with the light box 100 as two independent elements.

Thus, the digital photographing device 510 can capture images from the top surface of the base, when the light source device 400 provides lights towards the light input face 312 thereof, and the lights are directed outwards the optical module 300 via the light output face 311 thereof, or when the light source device 400 provides lights towards the light output face 311 thereof and the top surface of the base directly.

To sum up, the present disclosure of the document camera and its light box, which provide users to select one of different illumination directions to irradiate the light box by using a light source capable of changing the irradiating directions of lights. Thus, the present disclosure can decrease the quantity of the light source devices for the document camera, but still provides enough illumination for the document camera.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A light box, comprising:
    a base comprising:
        a bottom face;
        a top face opposite to the bottom face thereof;
        a sunken zone disposed on the top face;
        an opening penetrated through a lateral side of the base to communicate with the sunken zone; and
        at least one containing area sunken on the lateral side of the base to communicate with the sunken zone via the opening;
    an optical module contained in the sunken zone, having a light output face and a light input face thereon, wherein both the light output face and the light input face are light transmissive from the base, and the light input face of the optical module is exposed on the lateral side of the base to the containing area via the opening; and
    a light source device movably disposed in the containing area of the base for facing the light input face through the opening and facing the light output face when the light source device is moved away from the containing area, wherein
    when the light source device is moved into the containing area of the base to face the light input face thereof through the opening, the light source device provides lights towards the light input face thereof through the opening, when the light source device is moved away from the containing area of the base, the light source device provides lights towards the light output face thereof over the light output face.

2. The light box according to claim 1, wherein the light source device comprises:
    a moving member having an end thereof pivotally disposed in the containing area for rotating into or out of the containing area; and
    an irradiating portion disposed on the moving member for facing the light input face or the light output face.

3. The light box according to claim 2, wherein the irradiating portion comprises:
    a case pivotally disposed on the other end of the moving member; and
    a plurality of emitting elements disposed in the case, and served for irradiating lights to the light input face or the light output face.

4. The light box according to claim 2, wherein the containing area comprises:
    a fillister disposed on the base far away from the top face thereof and communicating with the containing area;
    a recoverable cover movably disposed in the fillister for ascending into the containing area or descending into the fillister; and
    a spring disposed in the fillister, having two opposite ends connected with the recoverable cover and the fillister, respectively,
    wherein when the moving member is rotated into the containing area, the moving member drives the recoverable cover from the containing area to the fillister.

5. The light box according to claim 2, wherein the containing area is matched with the light source device, and is presented as a shape of "L" type, "U" type or "I" type.

6. The light box according to claim 1, wherein the base has four lateral sides thereof for surrounding the sunken zone, and each of the lateral sides thereof has one of the openings, the containing area is presented as a shape of rectangular ring and surrounds the sunken zone, the moving member is a frame shaped as a rectangular ring, and is linearly and movably disposed in the containing area for ascending or descending in the containing area.

7. The light box according to claim 6, wherein four inner lateral sides of the moving member for surrounding the sunken zone respectively have a holding chamber thereon for placing one of the irradiating portions.

8. The light box according to claim 7, wherein the irradiating portion is pivotally disposed in the holding chamber.

9. A document camera, comprising:
    a light box according to claim 1; and
    a digital photographing device for capturing images from the top surface of the base.

* * * * *